United States Patent Office

3,433,800
Patented Mar. 18, 1969

---

3,433,800
PROCESS FOR PREPARING 4,5-BIS(DIFLUOR-AMINO)IMIDAZOLIDIN-2-ONE
James Brown Parker, Kilwinning, Scotland, assignor, by mesne assignments, to the United States of America as represented by the Secretary of the Navy
No Drawing. Filed Mar. 24, 1966, Ser. No. 538,899
Claims priority, application Great Britain, Apr. 28, 1965, 17,897/65
U.S. Cl. 260—309.7    8 Claims
Int. Cl. C07d 49/30; C07c 91/12; C06b 15/00

This invention relates to a process for the preparation of the compound 4,5-bis(difluoramino)imidazolidin-2-one, which compound has been described and claimed in copending application Ser. No. 434,742, filed Feb. 19, 1915. This compound is a useful energetic constituent of propellent explosives.

In the aforementioned application Ser. No. 434,742 the preparation of this compound by reacting 4,5-dihydroxy-imidazolidin-2-one or 4,5-dimethoxy-imidazolidin-2-one or 4,5-diethoxy-imidazolidin-2-one with difluoramine, was described.

An object of the present invention is the provision of another route by which the compound may be prepared.

In accordance with the present invention 4,5-bis(difluoramino)imidazolidin-2-one is prepared by reacting 1,2-bis(difluoramino)ethylene glycol with urea in an inert atmosphere in presence of a strongly water-absorbent or strongly water-reactive substance. The reaction may be represented as

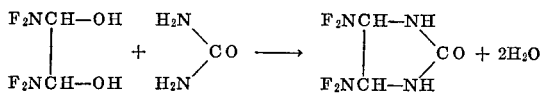

The term "inert atmosphere" is used herein to denote an atmosphere free from any constituent, such as oxygen, which will react with difluoramine.

The 1,2-bis(difluoramino)ethylene glycol used as starting material is conveniently prepared by reacting glyoxal and difluoramine together, the reaction being

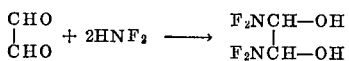

It may be added as such to the reaction vessel or it may be prepared in situ in the reaction vessel. In the latter process the glyoxal and difluoramine are preferably refluxed together in an inert atmosphere in presence of the urea to form 1,2-bis(difluoramino)ethylene glycol before the water-absorbent or water-reactive substance is added.

As the strongly water-absorbent substance, strong acids such as, for example, sulphuric acid or a halogenosulphonic acid such as fluorosulphonic acid are preferred.

Whilst the reaction may be carried out under a wide range of pressure, it is preferred to use atmospheric pressure and reflux conditions.

The reaction is preferably carried out in presence of difluoramine and preferably under conditions of difluoramine reflux (—23° C. at atmospheric pressure). The reaction may be carried out in an organic solvent, a preferred solvent being methylene chloride.

The invention is further illustrated by the following examples in which all parts and percentages are by weight.

EXAMPLE 1

2.5 parts of 1,2-bis(difluoramino)ethylene glycol (prepared by reacting glyoxal and difluoramine) were reacted with 0.9 part of urea in the presence of 5 parts of difluoramine and 10 parts of methylene chloride under conditions of difluoramine reflux at atmospheric pressure for 4 hours under a nitrogen atmosphere. 7 parts of fluorosulphonic acid were added and difluoramine reflux continued for a further 4 hours. Excess difluoramine was allowed to vent off in a slow stream of nitrogen and the reaction product mixture was poured over 100 parts of crushed ice. The aqueous mixture was extracted 5 times with 10 parts of diethyl ether and the ethereal solution was dried for 24 hours over anhydrous sodium sulphate. The ether was then removed under a pressure of 600 millimetres mercury and the residue recrystallised from ligroin/ethanol to give 3.1 parts of crystalline solid. This crystalline solid had a melting point of 172–3° C. and was identified by infra-red analysis as 4,5-bis(difluoramino)imidazolidin-2-one. On ignition the product flashed with a bright flame.

EXAMPLE 2

1.2 parts of 1,2-bis(difluoramino)ethylene glycol were reacted with 0.4 part of urea in the presence of 5 parts of difluoramine and 10 parts of methylene chloride under conditions of nitrogen reflux at atmospheric pressure for 4 hours under a nitrogen atmosphere. 7 parts of 96% sulphuric acid were added and difluoramine reflux continued for a further 4 hours. Excess difluoramine was allowed to vent off in a slow stream of nitrogen and the reaction mixture poured on to 100 parts of crushed ice. Treatment of the aqueous mixture as described in Example 1 gave 0.2 part of white solid, which was identified by means of its infra-red spectrum as 4,5-bis(difluoramino)imidazolidin-2-one.

EXAMPLE 3

2.0 parts of monomeric glyoxal were condensed into a reaction flask cooled to —80° C. 2.0 parts of urea were added to the flask and 4 parts of difluoroamine then refluxed on to the mixture for 3 hours, during which time the reaction flask was allowed to warm up to —23° C. 12 parts of fluorosulphoric acid were added dropwise to the reaction flask and difluoramine reflux continued for a further 4 hours. After allowing excess difluoramine to vent off overnight under a stream of nitrogen, the reaction mixture was poured on to 50 parts of ice/water. The aqueous solution was then extracted 5 times with 10 parts of diethyl ether. The ether extracts were combined, dried over anhydrous sodium sulphate and the solvent removed in a stream of nitrogen, leaving 0.9 part of a brown semisolid. Recrystallisation from benzene gave 0.4 part of white soid, M.P. 172–3° C., the infra-red spectrum of which was identical to that of 4,5-bis(difluoramino)imidazolidin-2-one.

What I claim is:
1. A process for the preparation of 4,5-bis(difluoramino)imidazolidin-2-one which comprises reacting 1,2-bis(difluoramino)ethylene glycol with urea in an inert atmosphere in presence of an acidic substance selected from the group consisting of strongly water-absorbent acidic substances and strongly water-reactive acidic substance.

2. A process as claimed in claim 1 wherein the 1,2-bis-(difluoramino)ethylene glycol is prepared by reacting glyoxal with difluoramine in situ.

3. A process as claimed in claim 2 wherein the glyoxal and difluoramine are refluxed in an inert atmosphere in the presence of urea to form 1,2-bis(difluoramino)-ethylene glycol before addition of the water-absorbent or water-reactive substance.

4. A process as claimed in claim 1 wherein said acidic substance is a strong acid which is strongly water-absorbent.

5. A process as claimed in claim 4 wherein the strong acid comprises an acid selected from the group consisting of sulpruric acid or a halogenosulphonic acid.

6. A process as claimed in claim 5 wherein the halogenosulphonic acid comprises fluorosulphonic acid.

7. A process as claimed in claim 1 wherein the reaction is carried out in presence of difluoramine.

8. A process as claimed in claim 7 wherein the process is carried out under conditions of difluoramine reflux.

References Cited

UNITED STATES PATENTS 3,215,709  11/1965  Logothetis _____ 260—349

OTHER REFERENCES

Banks: Fluorocarbons and Their Derivatives, Oldbourne Press (London), 1964, pp. 82 to 87.

LELAND A. SEBASTIAN, *Primary Examiner.*

U.S. Cl. X.R.

149—109; 260—584